United States Patent
Sherman et al.

(10) Patent No.: US 9,816,680 B2
(45) Date of Patent: Nov. 14, 2017

(54) LIGHTED CABLE TERMINATION DEVICE HAVING EXPANDED VIEWING AREA

(71) Applicants: Adam Sherman, Menlo Park, CA (US); James Beres, Menlo Park, CA (US); Rajasree Andeth Nair, Kerala (IN); Subhash Thanathalil Kumaran, Kerala (IN)

(72) Inventors: Adam Sherman, Menlo Park, CA (US); James Beres, Menlo Park, CA (US); Rajasree Andeth Nair, Kerala (IN); Subhash Thanathalil Kumaran, Kerala (IN)

(73) Assignee: Pentair Thermal Management LLC, Redwood City, CA (US)

( * ) Notice: Subject to any disclaimer, the term of this patent is extended or adjusted under 35 U.S.C. 154(b) by 75 days.

(21) Appl. No.: 14/297,445

(22) Filed: Jun. 5, 2014

(65) Prior Publication Data
US 2015/0354779 A1    Dec. 10, 2015

(51) Int. Cl.
*F21V 5/04* (2006.01)
*F21W 111/00* (2006.01)
(Continued)

(52) U.S. Cl.
CPC ............... *F21V 5/04* (2013.01); *F16L 53/008* (2013.01); *F21W 2111/00* (2013.01); *F21Y 2115/10* (2016.08)

(58) Field of Classification Search
CPC ............ F21Y 2101/02; F21W 2111/00; F21W 2111/02; F21W 2111/023; F21W 2111/027; F21W 2111/04; F21W 2111/043; F21W 2111/047; F21W 2111/06; F21W 2111/08; F21W 2111/10; F21V 5/00; F21V 5/002; F21V 5/003; F21V 5/004; F21V 5/005; F21V 5/006; F21V 5/007; F21V 5/008; F21V 5/02; F21V 5/04; F21V 5/041; F21V 5/043; F21V 5/045; F21V 5/046;
(Continued)

(56) References Cited

U.S. PATENT DOCUMENTS

| 2,175,067 A |   | 10/1939 | Rolph |         |
| 2,536,533 A | * | 1/1951  | Cannon | F21S 8/088 |
|             |   |         |        | 362/311.14 |

(Continued)

FOREIGN PATENT DOCUMENTS

| FI | EP 2541134 A2 * | 1/2013 | ............ F21S 8/08 |
| WO | WO 2015116656 A1 * | 8/2015 | ............ F21V 3/0463 |

OTHER PUBLICATIONS

International Search Report and Written Opinion of the International Searching Authority issued in PCT application No. PCT/US14/41170, dated Oct. 4, 2014, 9 pages.

*Primary Examiner* — Robert May
(74) *Attorney, Agent, or Firm* — Quarles & Brady LLP (57) ABSTRACT

Some embodiments provide a lighted cable termination assembly that includes a stand designed to be supported by a pipe and a substantially circular lens in communication with the stand. The lens includes a proud surface extending outwardly therefrom. A plurality of light emitting components are disposed under the lens. The proud surface of the lens provides an obstructed viewing angle of less than about 11° of the lighted cable termination assembly when installed on a 10 cm diameter pipe.

8 Claims, 11 Drawing Sheets

(51) Int. Cl.
*F16L 53/00* (2006.01)
*F21Y 115/10* (2016.01)

(58) Field of Classification Search
CPC ... F21V 5/048; F21V 5/06; F21V 5/08; F21K 9/135; F21K 9/232; F21S 8/085; F21S 8/086; F21S 8/088
See application file for complete search history.

(56) References Cited

U.S. PATENT DOCUMENTS

| | | | |
|---|---|---|---|
| 3,851,149 A | 11/1974 | Daley | |
| 4,066,870 A | 1/1978 | Colten | |
| 4,264,948 A * | 4/1981 | Cherouge | F21V 5/04 362/311.01 |
| 4,270,162 A * | 5/1981 | Cherouge | B63C 9/20 362/311.07 |
| 4,375,634 A * | 3/1983 | Leis | B60Q 1/2611 315/200 A |
| 4,650,971 A | 3/1987 | Manecci | |
| 4,716,508 A | 12/1987 | Kramer | |
| 4,792,717 A | 12/1988 | Ferenc | |
| 4,839,781 A | 6/1989 | Barnes et al. | |
| 4,847,447 A | 7/1989 | Eiswirth et al. | |
| 4,856,103 A | 8/1989 | Compton | |
| 4,866,329 A | 9/1989 | Ferenc | |
| 4,877,943 A | 10/1989 | Oiwa | |
| 5,319,365 A * | 6/1994 | Hillinger | B60Q 7/00 248/121 |
| D384,770 S | 10/1997 | Bray | |
| D388,526 S | 12/1997 | Bray | |
| 5,792,987 A * | 8/1998 | Dong | H02G 15/046 174/74 A |
| 6,808,293 B2 | 10/2004 | Watanabe et al. | |
| 6,964,494 B2 * | 11/2005 | Niven | E01F 9/0165 362/186 |
| 7,025,476 B2 | 4/2006 | Leadford | |
| 7,540,631 B2 | 6/2009 | Watanabe et al. | |
| 7,581,854 B2 | 9/2009 | Ford | |
| 8,047,679 B2 | 11/2011 | Wu et al. | |
| 8,167,462 B2 | 5/2012 | Kim et al. | |
| 8,282,249 B2 | 10/2012 | Liang et al. | |
| 8,480,257 B2 | 7/2013 | Shang et al. | |
| 8,496,349 B2 | 7/2013 | Wu et al. | |
| 8,998,443 B1 * | 4/2015 | Shumate | F21V 5/045 340/815.45 |
| 2009/0316147 A1 | 12/2009 | Hamilton | |
| 2011/0228542 A1 | 9/2011 | Hsueh | |
| 2012/0044682 A1 | 2/2012 | Allen et al. | |
| 2012/0098404 A1 | 4/2012 | Kaandorp et al. | |
| 2013/0120990 A1 | 5/2013 | Wu et al. | |
| 2015/0255230 A1 * | 9/2015 | Halama | F21V 5/008 200/314 |

* cited by examiner

LIGHTED CABLE TERMINATION DEVICE HAVING EXPANDED VIEWING AREA

RELATED APPLICATIONS

Not Applicable

BACKGROUND

Piping systems are often used to transport a liquid and/or gas product, such as a petroleum product, over varying distances. Generally, a piping system is used to transport the liquid product from an extraction point to a processing facility. In some instances, both the extraction location and the processing facility are located in cold weather environments. In such environments, a heating mechanism is often used in conjunction with the piping system to maintain the pipes at a certain temperature to prevent the liquid product from freezing. Heating mechanisms may also be utilized to ensure that the liquid product is maintained at a temperature that allows for an efficient flow of the liquid product through the piping system.

Piping systems are generally heated using a heating cable. The heating cable can be applied along the entire length of a piping system, or, in some instances, only along portions of the piping system as needed. Generally, the heating cables are electrically powered. However, in some instances steam tracing may be used to heat pipes. In situations when electrical heating is used, operation of the heating cable is frequently verified to ensure that the pipe and/or product within the pipe are at an appropriate temperature and/or to prevent possible freezing of the piping system. Additionally, failure of the heating cable can result in the liquid product becoming more viscous. In some instances, the increase in viscosity can lead to a pressure buildup in the piping system. Due to the volatile nature of some liquid products transported in piping systems, an uncorrected pressure buildup could result in a rupture in the piping system, potentially causing environmental harm.

In some existing systems, proper operation of electric heating cables can be verified in multiple ways. One system verifies operation via monitoring of an electric signal, which is the flow of current through a heating cable. However, this form of monitoring may not always be accurate due to the long distances involved and the potential for short circuit conditions in the heating cable. Additionally, electronically monitoring individual heating circuits may not be economically feasible in situations in which many heating cable circuits are present, such as in a processing facility. Furthermore, significant preventative maintenance may be required to ensure accurate monitoring of the heating cables due to the potential complexity associated with electronic monitoring.

Another method of verifying operation of heating cables is via visual inspections. Typically, an employee physically walks around areas having a heating cable and inspects lighted towers, which are in communication with the heating cable. Often, the lighted towers are used to electrically terminate the heating cable. Although the lighted towers are simple and cost efficient, often visual inspection is difficult due to the location of the lighted tower. Visual inspection is particularly troublesome when the lighted tower is located along a portion of a piping system elevated overhead. For example, a user may be required to maneuver themselves into a dangerous position in order to verify the proper operation of the heating cable in situations in which a piping system is elevated overhead.

Additionally, in certain environments, a piping system may include pipes that have significant diameters and/or include large amounts of insulation. Pipe thickness and/or the presence of insulation can occlude a user's ability to determine if the lighted tower is illuminated. Occlusion can be especially problematic when the lighted tower is elevated above a user, as only a portion of the lighted tower may be visible due to the increased diameter of the pipe with or without the additional insulation.

Thus, there is a need for a lighted tower for verifying the operational status of a heating cable that is visible from a large number of positions. Specifically, there is a need for a lighted tower for verifying the operational status of a heating cable that can be seen by a user positioned from a plurality of positions including beneath the lighted tower, without the user being required to unnecessarily reposition themselves to confirm the illumination of the lighted tower. By verifying the operational status of a heating cable, a user can verify that the pipe is being heated. Furthermore, verification of the operational status allows for a user to determine that there is potentially hazardous electrical power present on the heating cable.

SUMMARY

Some embodiments provide a lighted cable termination assembly that includes a stand designed to be supported by a pipe and a substantially circular lens in communication with the stand. The lens includes a proud surface extending outwardly therefrom. A plurality of light emitting components is disposed under the lens. The proud surface of the lens provides an obstructed viewing angle of less than about 11° assuming installation of the lighted cable termination assembly on a 10 cm diameter pipe.

Other embodiments provide a lens for use in a lighted cable termination assembly. The lens includes a pedestal that defines an opening in one end and includes a curved sidewall at an opposing end, and the sidewall includes a proud surface disposed adjacent to a lower edge thereof.

Still further embodiments provide for a method of determining an operational status of a lighted cable termination assembly. The method includes the steps of providing a stand designed to be coupled to a pipe and providing a lens having a proud surface and a plurality of light emitting diodes disposed within the lens. The lighted cable termination assembly is coupled to a pipe in communication with a heat trace cable. The operational status of the lighted cable termination assembly is determined by viewing light emitted from the proud surface of the lens.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
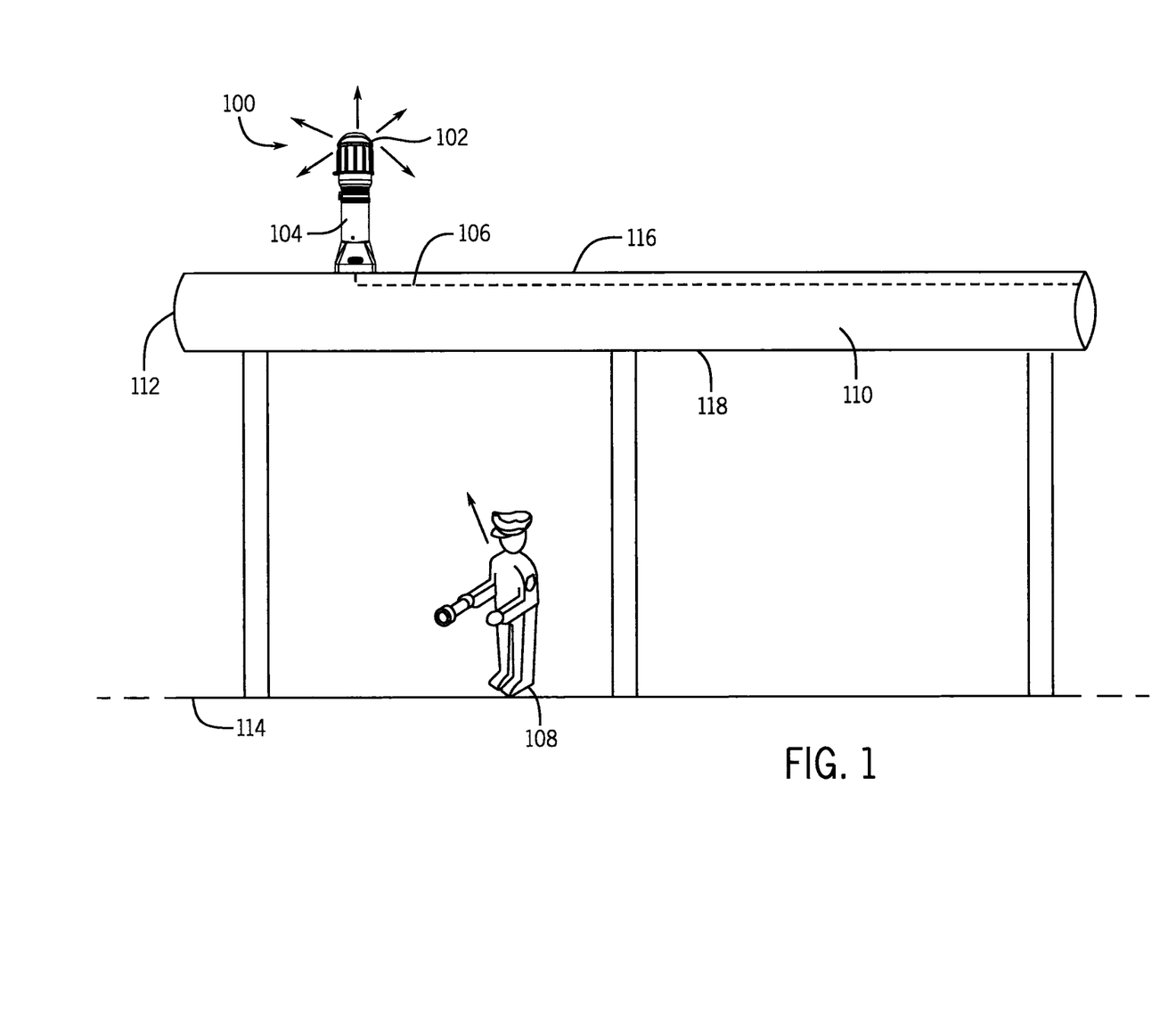
FIG. 1 is an illustrative representation showing a typical installation of a lighted cable termination assembly.

FIG. 1 illustrates a typical application of a lighted cable termination assembly 100 according to one embodiment. The lighted cable termination assembly 100 is provided in the form of a lighted end cap device 102 in communication with a stand 104. The lighted cable termination assembly 100 is designed to provide illumination when a power source (not shown) is applied to a heat trace cable 106. A user 108 can verify operation of the heat trace cable 106 by visually monitoring the lighted cable termination assembly 100, and verifying the lighted cable termination assembly 100 is illuminated. The present technology is directed to a lighted cable termination assembly 100 that is designed to provide illumination that is visible from a range of angles to allow for easier verification by the user 108.

In a typical application, the lighted cable termination assembly 100 is in communication with the heat trace cable 106, which is installed on or in a pipe 110. In some situations, the heat trace cable 106 is designed to heat the pipe 110. The heat trace cable 106 can be associated with the pipe 110 in any number of configurations, including, for example, placement on an exterior surface and/or interior cavity of the pipe 110. A typical installation of the heat trace cable 106 on the exterior surface of the pipe 110 can be via attaching the heat trace cable 106 to the exterior surface of the pipe 110, underneath any thermal insulation. In other instances, the heat trace cable 106 may be generally allowed to float freely within the cavity of the pipe 110. The lighted cable termination assembly 100 may be directly joined to the heat trace cable 106 and/or may be otherwise in communication with the heat trace cable 106. In some embodiments, the lighted cable termination assembly 100 is positioned along a heat trace cable 106, and in some instances is positioned at an end of the heat trace cable 106. In one embodiment, the lighted cable termination assembly 100 is designed to be used with RAYCHEM brand BTV, QTVR, XTV, VPL, and KTV self-regulating or power limiting parallel type heating cables. The lighted cable termination assembly 100 may be used with other types of cables for other applications including Still referring to FIG. 1, the lighted cable termination assembly 100 is coupled to one or more pipes 110. In some embodiments, the pipe 110 is provided in the form of an elongate cylinder with a curved surface 112. The lighted cable termination assembly 100 may be imparted with characteristics designed to accommodate the curved surface 112 of the pipe 110 (e.g., curvature disposed in the stand 104 that corresponds to the curvature of the pipe). In other embodiments, the pipe 110 may be provided in other shapes and sizes.

The pipe 110 with the lighted cable termination assembly 100 may be positioned in any convenient location. In one embodiment depicted in FIG. 1, the pipe 110 is elevated above ground level 114. In other embodiments, the pipe 110 can be at least partially located underground (not shown). In other instances, portions of a pipe 110 (and/or a plurality of pipes 110) may be located at ground level 114, above ground level 114, below ground level 114, and/or combinations thereof. Additionally, one or more segments or portions of the pipe 110 can be oriented horizontally or vertically with respect to the ground level 114. Alternatively, the pipe 110 can be oriented at any angle with respect to the ground level 114.

The lighted cable termination assembly 100 is designed to be in communication with the pipe 110. The lighted cable termination assembly 100 may be positioned in any number of locations adjacent to and/or in communication with the pipe 110. For example, the lighted cable termination assembly 100 may be positioned on an upper surface 116 of the pipe 110, distal from the ground level 114. In other embodiments, the lighted cable termination assembly 100 may also be positioned on a lower surface 118 of the pipe 110, distal from ground level 114. The lighted cable termination assembly 100 may also be positioned at one or more points along the pipe 110. In other embodiments, the pipe 100 may be oriented in other manners and the lighted cable termination assembly 100 may be positioned adjacent any surface of the pipe 100.

Figure 2:
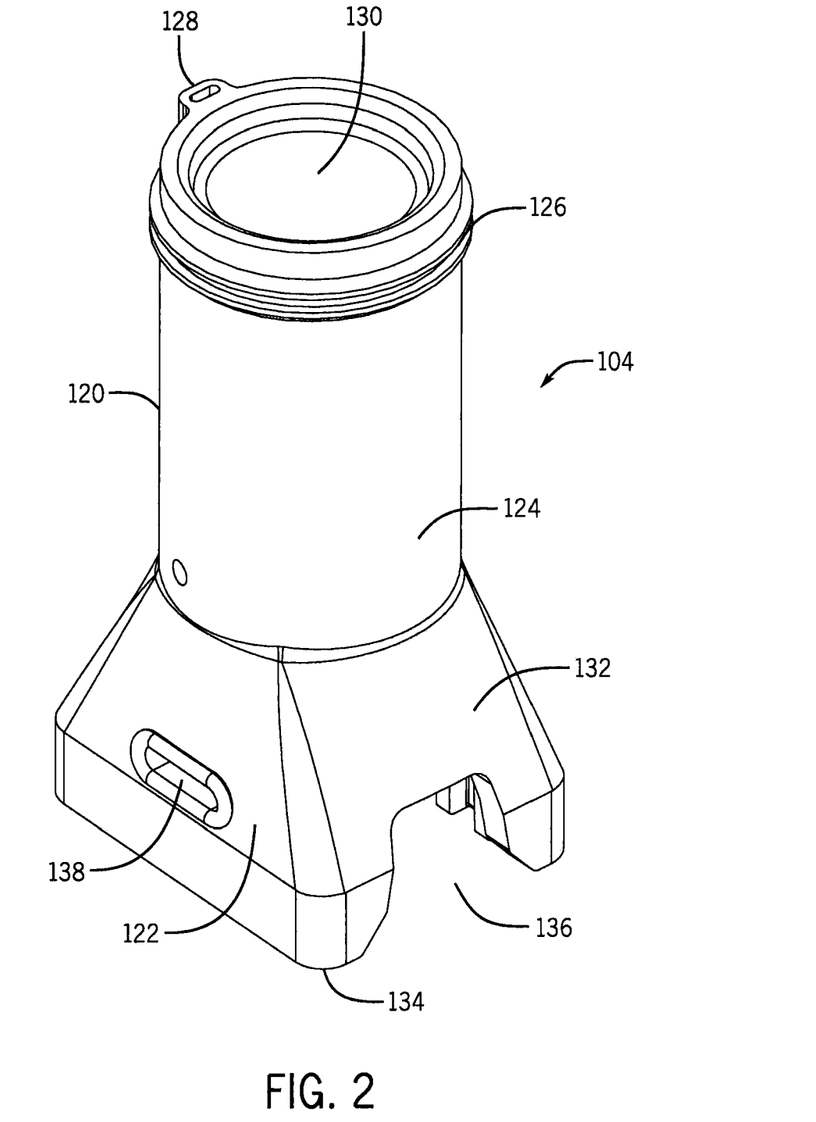
FIG. 2 is a front isometric view of a stand.

As shown in FIG. 2, the stand 104 includes a housing 120 and a base 122. The stand 104 is provided to support the lighted end cap device 102 and to facilitate the connection of the heat cable 106 to the lighted end cap device 102. The housing 120 is elongate and includes a cylindrical sidewall 124 extending downwardly until terminating at the base 122. A flange 126 circumscribes the housing 120 and is disposed at an opposite end from the base 122. The flange 126 includes an extended tab 128 along one portion of the flange 126. The extended tab 128 can accommodate a locking strap (not shown) that allows for the lighted end cap device 102 to be locked to the stand 104. The housing 120 further defines an opening 130 designed to receive the lighted end cap device 102. The housing 120 may also include one or more threads (not labeled) disposed on an interior or exterior surface thereof that are designed to interact with a corresponding threaded portion associated with the lighted end cap device 102.

Still referring to FIG. 2, the base 122 includes angled sidewalls 132 that form a receiving surface 134 designed to interact with the pipe 110. The base 122 also includes a plurality of substantially square openings 136 that can accommodate the heat trace cable 106 while allowing the receiving surface 134 to interact directly with the pipe 110. The base 122 also includes a plurality of elongated openings 138 located on one or more of the angled sidewalls 132. The plurality of elongated openings 138 are disposed substantially opposite each other along a common plane. In some embodiments, the plurality of elongated openings 138 can accommodate a mechanism (e.g., a strap, wire, and the like) for coupling the stand 104 to the pipe 110. In other embodiments, the stand 104 can be connected to the pipe 110 using a known pipe strap. Alternatively, the stand 104 can be connected to the pipe 110 using other coupling devices.

The stand 104 can also optionally contain a strain relief device (not shown) within the housing 120. The strain relief device can be used to assist in coupling the heat trace cable 106 to the lighted end cap device 102. The stand 104 may also contain terminal blocks (not shown) within the housing 120 for allowing an electrical connection between the heat trace cable 106 and the lighted end cap device 102.

As discussed above, the stand 104 can be coupled at a first end to the lighted end cap device 102. In one embodiment, the lighted end cap device 102 may be sold separate from the stand 104 and is designed to be coupled to an existing stand, such as a RAYCHEM brand E-100-L stand. In other embodiments, the lighted end cap device 102 and stand 104 may be supplied as a kit, which can be assembled in the field at the time of installation.

Figure 3:
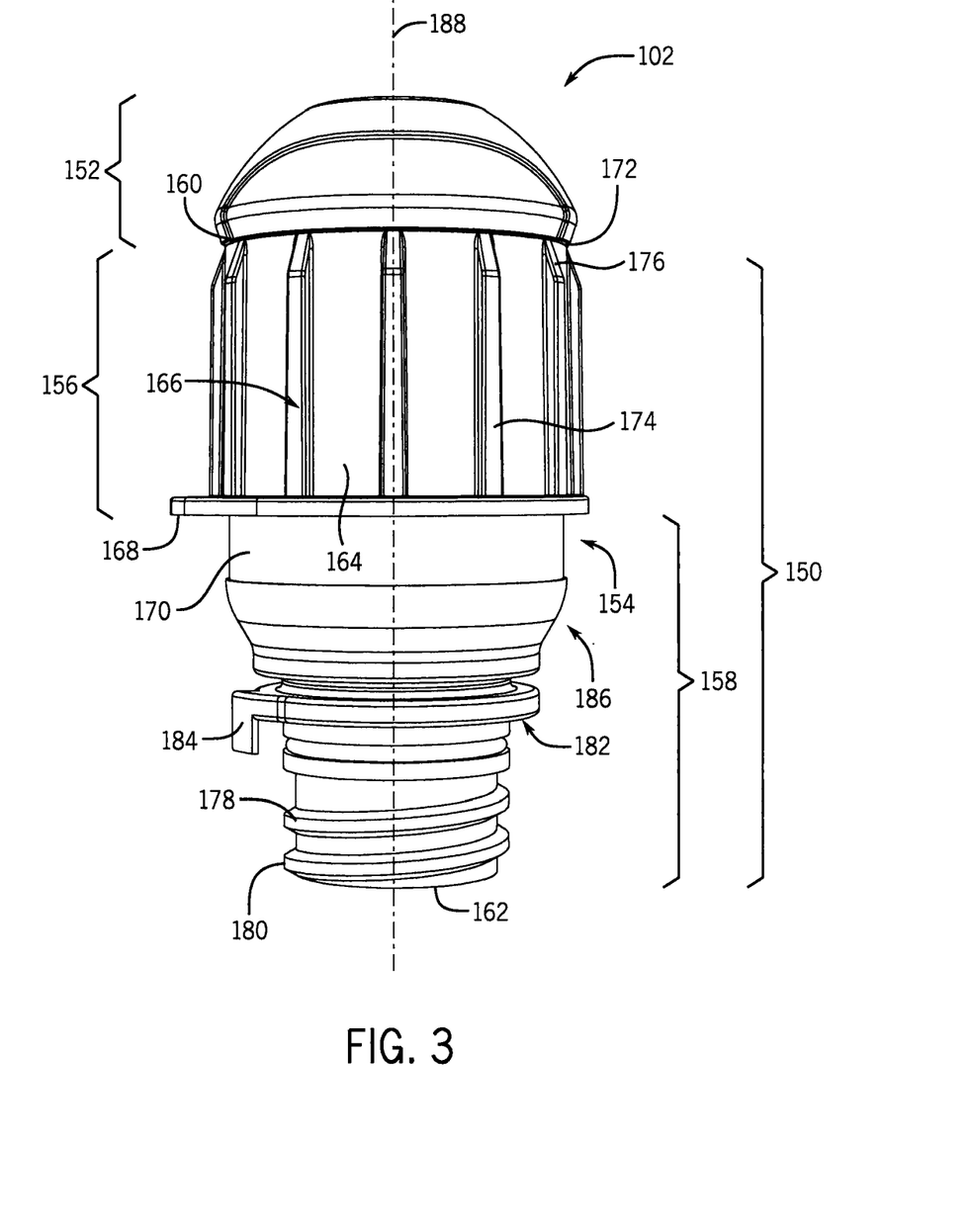
FIG. 3 is a front isometric view of a lighted termination device base component having a lens assembly thereon.

FIG. 3 illustrates an embodiment of the lighted end cap device 102. The lighted end cap device 102 is designed to be joined to and/or supported by the stand 104. The lighted end cap device 102 provides an indication that the heat trace cable 106 coupled to the lighted end cap device 102 is properly operating. More particularly, the lighted end cap device 102 provides an indication that the heat trace cable 106 is operating via an illumination mechanism, described in more detail below.

Still referring to FIG. 3, the lighted end cap device 102 includes a base component 150 designed to support a lens 152. The base component 150 is provided in the form of a substantially cylindrical body 154 defined by an upper portion 156 and a lower portion 158. The upper portion 156 of the cylindrical body 154 includes a substantially circular opening 160 designed to support the lens 152 and a lower circular opening 162 designed to provide communication between components disposed within the stand 104 and components disposed within the lighted end cap device 102. The base component 150 can contain circuitry associated with providing illumination and can include both illumination circuitry and power conditioning circuitry, discussed in more detail below.

The upper portion 156 includes a sidewall 164 interrupted by one or more elongated vertical ribbed members 166 protruding outwardly from an exterior surface of the sidewall 164. The sidewall 164 can include a shoulder 168 which circumscribes and extends outwardly adjacent a lower edge 170 of the sidewall 164. The vertical ribbed members 166 extend upwardly from the shoulder 168 along the sidewall 164 until terminating at an upper edge 172. The vertical ribbed members 166 each include a substantially rectilinear body 174 terminating at an angled end portion 176. The vertical ribbed members 166 can be used to provide a gripping surface for a user when separating or attaching the lighted end cap device 102 and the stand 104. The vertical ribbed members 166 and shoulder 168 are designed to minimize the risk of a static charge discharge by limiting the surface area that would be contacted by a user. The vertical ribbed members 166 and shoulder 168 can also support the weight of a test fixture used during manufacturing to keep the weight of the test fixture off the lens 152. In some embodiments, the vertical ribbed members 166 may be uniformly spaced around the sidewall 164 and may contain twelve vertical ribbed members 166. Alternatively, the upper portion 156 of the base component 150 may contain more than twelve vertical ribbed members 166 or less than twelve vertical ribbed members 166.

The lower portion 158 of the base component 150 further includes a threaded cylindrical section 178 with one or more threads 180 that protrude outwardly and circumscribe the exterior surface of the base component 150. In some embodiments, the threads 180 are designed to interface with the corresponding threaded section of the stand 104 to couple the base component 150 to the stand 104. The lower portion 158 can also include a flange 182 which circumscribes and extends outwardly adjacent the threaded cylindrical section 178. The flange 182 can include a tab 184 that extends downwardly away from the upper portion 156. The tab 184 may come into contact with the extended tab 128 of the stand 104 (see FIG. 2) to prevent the lighted end cap device 102 from being over tightened when being attached to the stand 104. The lower portion 158 of the base component 150 can also include a tapered sidewall 186 which transitions between the threaded cylindrical section 178 and lower edge 170 of the upper portion 156.

The base component 150 further includes the lower circular opening 162 disposed opposite the lens 152 along a central longitudinal axis 188 for access to the internal components of the lighted end cap device 102. Additionally, the lower circular opening 162 can allow a user to electrically couple the lighted end cap device 102 to the heat trace cable 106. Additionally, in one embodiment, a non-rigid potting compound (not shown) can be contained in the lower circular opening 162 to seal the internal area of the base component 150 from the external environment. In one embodiment, the non-rigid potting compound can be a silicone type-gel. The non-rigid potting compound can prevent the ingress of an external contaminate into the base component 150 and can also isolate electronic circuitry, which may be located internal to the base component 150, away from the external atmosphere to prevent any electrical arcing from reaching the external atmosphere when the lighted end cap device 102 is used in an explosive environment. The non-rigid potting compound can provide sufficient isolation of the electronic circuitry from the external atmosphere to satisfy regulatory requirements for hazardous environment, such as, for example, CSA, FM, PTB, DNV, IECEx, and InMetro Zones 1 and 2. Alternatively, the lower circular opening 162 can contain rigid type potting compounds to seal the internal area of the base component 150 from the external environment.

The stand 104 and/or base component 150 may be manufactured using materials particularly suitable for the environment. In one embodiment, the stand 104 and/or base component 150 can be a polymer type material. Appropriate polymer materials could be, but are not limited to, ABS, PVC, and the like. In a further embodiment, the stand 104 and/or base component 150 can be made using an injection molding process. In alternate embodiments, the stand 104 and/or base component 150 can be made using a casted metal. Appropriate metal materials could be, but are not limited to, steel, aluminum, ceramic and the like. However, any suitable material could be used for producing the stand 104 and/or base component 150. The stand 104 and/or base component 150 material can be suitable for use in outdoor environments. For example, the stand 104 and/or base component 150 material may also be capable of installation in environments with ambient temperature from about negative 40° C. to about positive 40° C.

Figure 4:
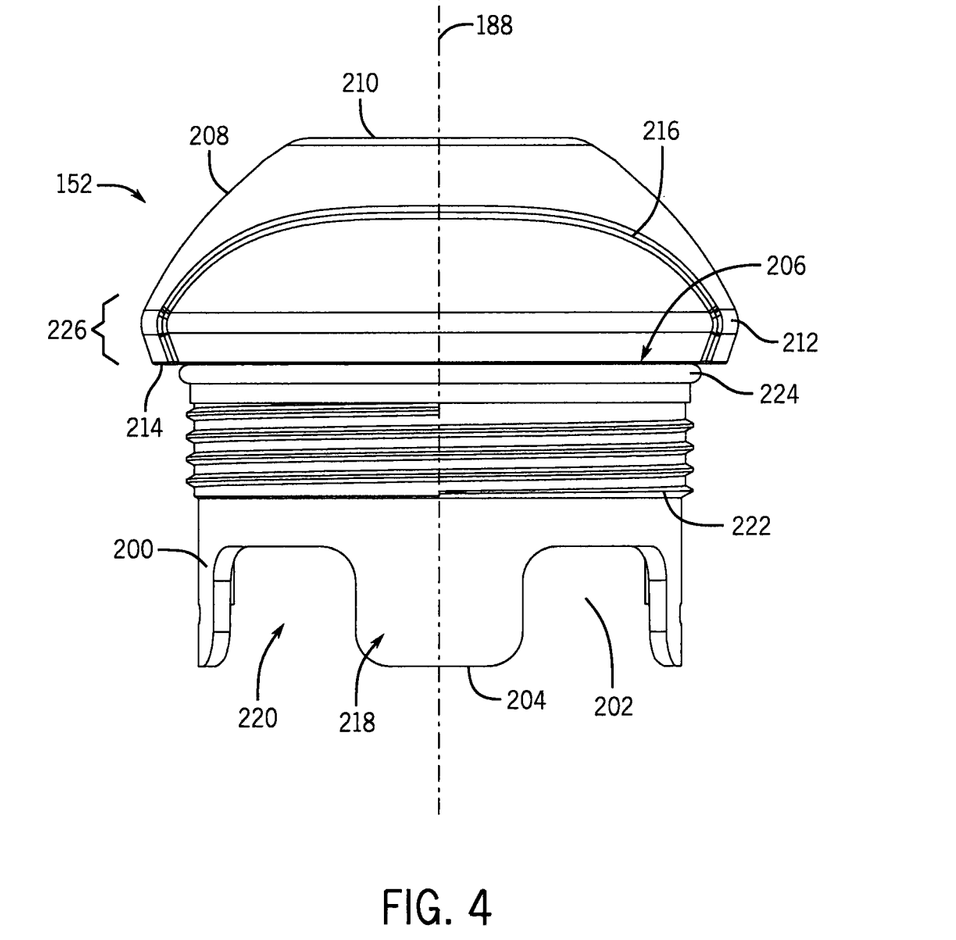
FIG. 4 is a front isometric view of the lens assembly of FIG. 3.
Figure 5:
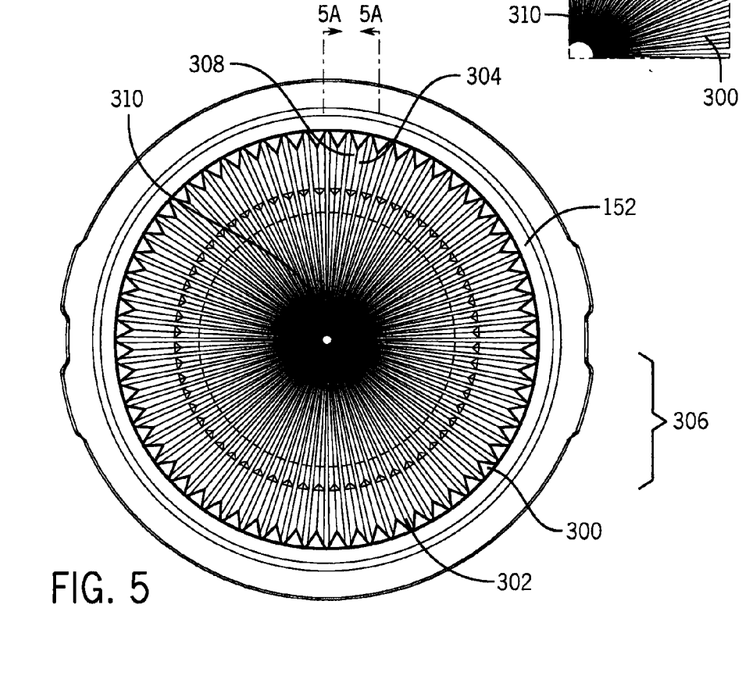
FIG. 5 is a top elevational view showing an embodiment of a diffuser for use in a lens assembly.
Figure 5A:
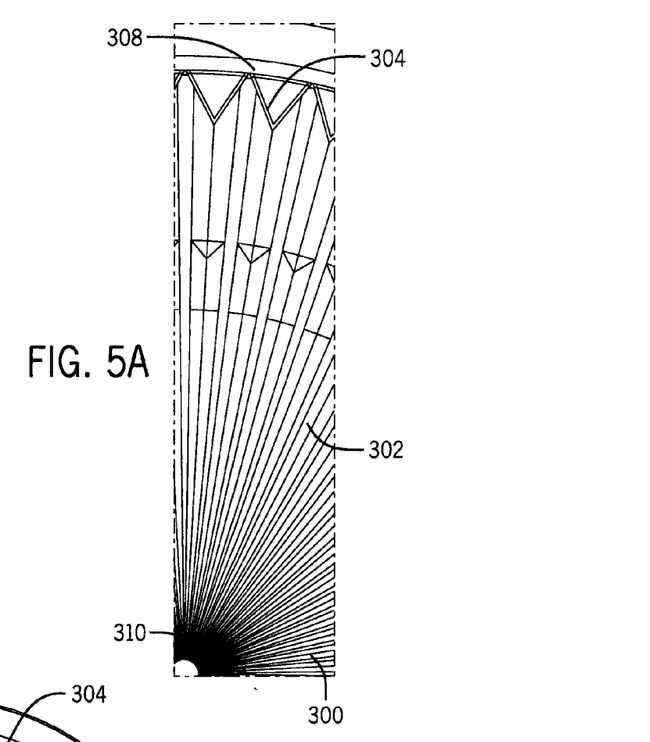
FIG. 5A is a portion of the diffuser of FIG. 5 enlarged for magnification purposes.

Now turning to FIGS. 4-5A, the lens 152 is designed to interact with the upper edge 172 of the base component 150. The lens 152 includes a cylindrical pedestal 200 that extends upwardly and terminates at a curved sidewall 208. The cylindrical pedestal 200 defines an opening 202 at a first end 204 and supports the curved sidewall 208 at a second opposing end 206.

The cylindrical pedestal 200 of the lens 152 is defined by a sidewall 218 interrupted by one or more substantially rectangular openings 220 and further includes a threaded portion 222 that circumscribes the sidewall 218 and is disposed above the substantially rectangular openings 220. The threaded portion 222 can be used to couple the lens 152 to the base component 150. In one embodiment, the threaded portion 222 can be molded into the cylindrical pedestal 200. Alternatively, the threaded portion 222 can be machined into the cylindrical pedestal 200. A gasket 224 provided in the form of an elastomeric material can be located above the threaded portion 222 to provide a seal between the base component 150 and the lens 152. The gasket 224 can provide protection from the ingress of external contaminates. Non-limiting examples of external contaminates can include water, oil, dust, gas, or the like. In some instances, the gasket 224 can provide a seal capable of meeting an IP66 rating, or a NEMA 4x rating. The gasket 224 may be provided in any number of materials as known in the art.

Referring to FIG. 4, the curved sidewall 208 is disposed above the cylindrical pedestal 200 and gently slopes upwardly and inwardly until terminating at a substantially flat upper surface 210. The curved sidewall 208 includes a proud surface 212 protruding outwardly adjacent a lower edge 214 of the curved sidewall 208. The lens 152 further includes one or more grooves 216 disposed in the surface of the curved sidewall 208. The one or more grooves 216 can be molded into the lens 152. In one embodiment, the one or more grooves 216 can act as a diffusion element to further diffuse the light from the lens 152. The one or more grooves 216 can also be used as a contact point for an automated assembly device for assembling the lens 152 to the base component 150. The proud surface 212 of the lens 152 is provided to ensure a person will be capable of viewing the lens (and illumination therefrom) from different angles as described in more detail below. To that end, the proud surface 212 of the lens 152 extends outwardly past the footprint of the base component 150.

The proud surface 212 of the lens 152 can have a maximum diameter larger than the maximum diameter of the upper edge 172 of the sidewall 164 of the base component 150. In some embodiments, the proud surface 212 of the lens 152 can have a maximum diameter larger than the maximum diameter of the cylindrical sidewall 124 of the stand 104. In one embodiment, the maximum diameter of the proud surface 212 of the lens 152 can be about 2% larger than the maximum diameter of the upper edge 172 of the sidewall 164 as measured from the central longitudinal axis 188 of the base component 150. In a further embodiment, the maximum diameter of the proud surface 212 of the lens 152 can be about 1% to about 4% larger than the maximum diameter of the upper edge 172 of the sidewall 164 of the base component 150 as measured from the central longitudinal axis 188 of the base component 150.

Continuing with FIG. 4, the proud surface 212 of the lens 152 can be seen in greater detail. In one embodiment, the proud surface 212 can extend outwardly approximately from the central longitudinal axis 188 about 5% to about 20% further than the lower edge 214 of the lens 152. The diameter of the proud surface 212 can be about 6.2 cm. Alternatively, the proud surface 212 can have a maximum diameter of about 6.9 cm as measured about the central longitudinal axis 188 of the base component 150. Additionally, the proud surface 212 can have a minimum diameter of about 6.2 cm. A transition distance 226 may be provided between the proud surface 212 and the lower edge 228 and can be approximately 0.5 cm. The transition distance 226 between the proud surface 212 and the lower edge 214 can also be about 0.3 cm to about 0.5 cm. The longitudinal distance between the lower edge 214 and the substantially flat upper portion 210 as measured along the central longitudinal axis 188 of the base component 150 can be about 2.4 cm. The longitudinal distance between the lower edge 214 and the substantially flat upper portion 210 as measured along the central longitudinal axis 188 of the base component 150 can also be about 2.29 cm to about 2.44 cm.

One or more portions of the lens 152 can be made of one or more translucent and/or transparent materials designed to allow for light transmission therethrough. In some embodiments, the material can be a polymer type material. The polymer material can be a material such as ABS. In one specific embodiment, the lens 152 can be made of a substantially clear polycarbonate material. Additionally, the lens 152 can be made of a colored translucent and/or transparent material to provide a specific illumination color. In one embodiment, the colored transparent material can be a red colored transparent material. In an alternate embodiment, the colored transparent material can be a green colored transparent material. However, the transparent material can be provided in any color as applicable.

Turning to FIGS. 5 and 5A, a top elevational view and a magnified view of the lens 152 are illustrated. The lens 152 includes a mechanism designed to enhance light emitted therefrom and to substantially equally distribute light through the lens 152. The lens 152 may include a diffuser 300 molded into at least a portion thereof. In some embodiments, the diffuser 300 can be molded into the lens 152 such that the diffuser 300 covers 100% of the curved sidewall 208. In other embodiments, the diffuser 300 may comprise less than 100% of the curved sidewall 208 of the lens 152. The diffuser 300 may also be molded into other portions of the lens 152, such as, for example, the upper surface 210. In other embodiments, the diffuser 300 may be pressed into the lens 152, or otherwise configured in a non-integral manner. In some embodiments, the diffuser 300 can be separately installed underneath, or adjacent to the lens 152.

Still referring to FIGS. 5 and 5A, the diffuser 300 can be provided in the form of a prism 302 comprising a plurality of prismatic elements 304. In one embodiment, the plurality of prismatic elements 304 can be in the form of a substantially tapered isosceles triangle. The prism 302 can be formed with the plurality of prismatic elements 304 axially projected along an inner face of the lens 152 to form an axial pattern 306. In some instances, the prism 302 can be comprised of about sixty prismatic elements 304. The prism 302 can also be comprised of more or less than sixty prismatic elements 304 as required to provide the proper amount of diffusion. In other embodiments, the plurality of prismatic elements 304 can taper in width from an outer portion 308 of the prism 302 to the inner portion 310 of the prism 302, as shown in FIG. 5A. In one specific embodiment, the outer portion 308 of the plurality of prismatic element can be about 0.236 cm in width and the inner portion 310 of the prism 302 can be about 0.005 cm in diameter. The taper of the plurality of prismatic elements 304 from the inner portion 310 to the outer portion 308 can have a ratio of about 46 to about 1.

Figure 6:
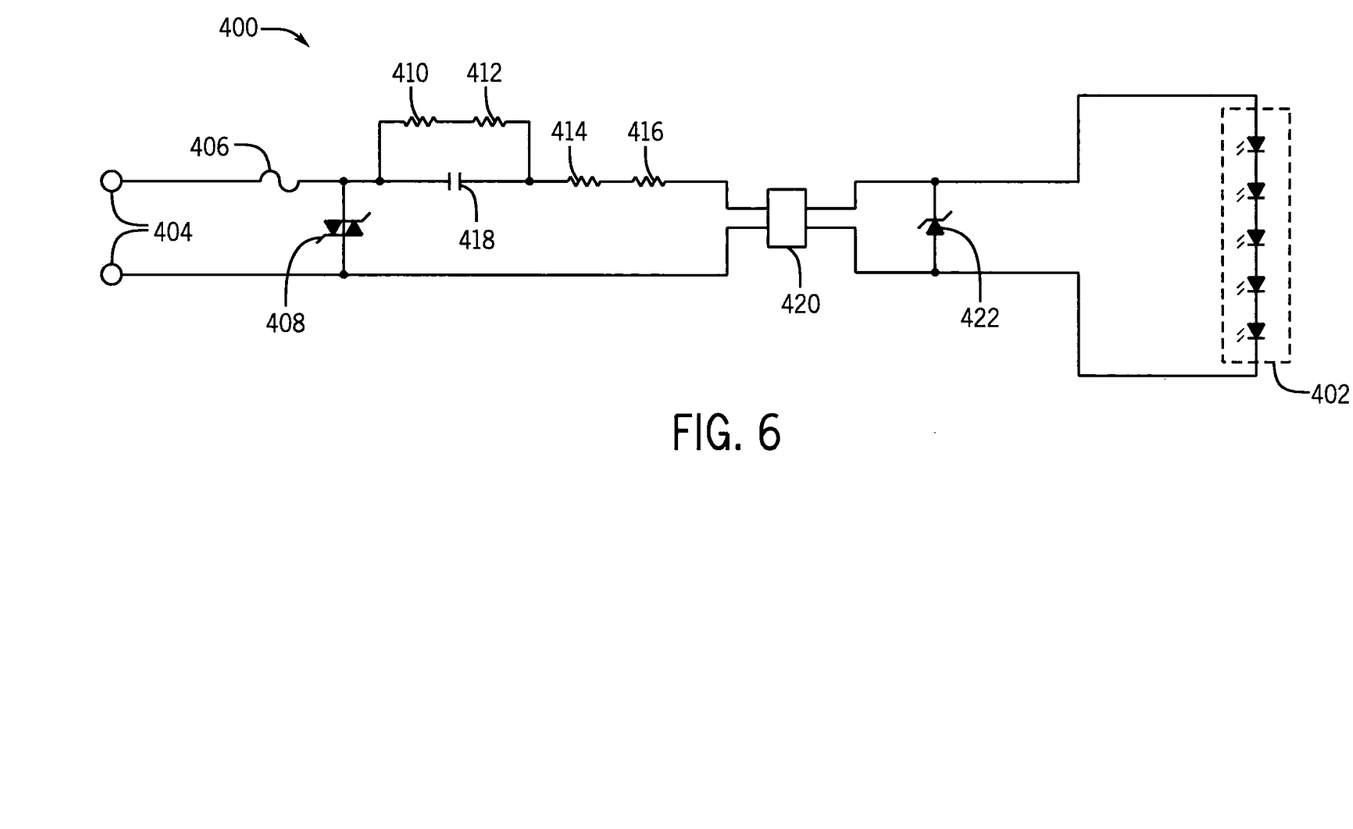
FIG. 6 is schematic view of a lighting circuit of a lighted cable termination assembly according to one embodiment.

FIG. 6 shows a typical schematic of a lighting circuit 400 contained in the lighted cable termination assembly 100. The lighting circuit 400 can contain a plurality of light emitting components 402. In some embodiments, the plurality of light emitting components 402 are provided in the form of one or more Light Emitting Diode ("LED") type devices. The plurality of light emitting components 402 can emit a specific color, for example, a red light. Alternatively, the plurality of light emitting components 402 can emit a green light. In some embodiments, the plurality of light emitting components 402 can emit other colors of light as required for a given application. The plurality of light emitting components 402 can provide about 1 lumen to about 5 lumens of illumination per light emitting component 402. Alternatively, the light emitting components 402 can each provide more than 5 lumens of illumination per light emitting component 402.

Additionally, the lighting circuit 400 can have a power input connection point 404 for connecting external power to the lighting circuit 400. In one embodiment, the power input connection point 404 can be comprised of flying leads attached to the lighting circuit 400. The power input connection point 404 can also comprise plurality of terminal blocks (not shown) allowing a user to attach power wires from the heat trace cable 106. Input power can be provided from the heat trace cable 106, and/or from another source.

The lighting circuit 400 can also contain an over-current protection device 406, which in some instances can be a fuse. In other embodiments, the over-current protection device 406 can be a circuit breaker.

The lighting circuit 400 can also contain an over-voltage protection device 408, which in some embodiments, can be in the form of a Metal Oxide Varistor ("MOV"). However, in other embodiments, other over-voltage protection devices 408 could also be used. The lighting circuit 400 can also contain a plurality of resistive elements 410, 412, 414, 416 and a capacitive element 418. The plurality of resistive elements 410, 412, 414, 416 and the capacitive element 418 can be used to regulate the current presented to a rectification device 420, which in some instances can be a bridge rectifier. The lighting circuit 400 can also include a voltage regulation device 422, which in some instances can be a zener diode. The voltage regulation device 422 may provide a constant DC voltage to the plurality of light emitting components 402. The voltage regulation device 422 can provide a DC voltage of about 3.0 VDC to about 5.0 VDC to the plurality of light emitting components 402.

The lighting circuit 400 can also be compatible with an AC input voltage. In one embodiment, the lighting circuit 400 can be compatible with an AC input voltage from about 100 VAC to about 277 VAC. In another embodiment, the lighting circuit 400 can be compatible with an AC input voltage of about 480 VAC. The lighting circuit 400 can also be compatible with an AC voltage having a frequency of about 50 Hz to about 60 Hz. In an additional embodiment, the lighting circuit 400 can have a current rating of about 50 amperes. In alternate embodiments, the lighting circuit 400 can have a current rating of more than 50 amperes or less than 50 amperes.

Figure 7:
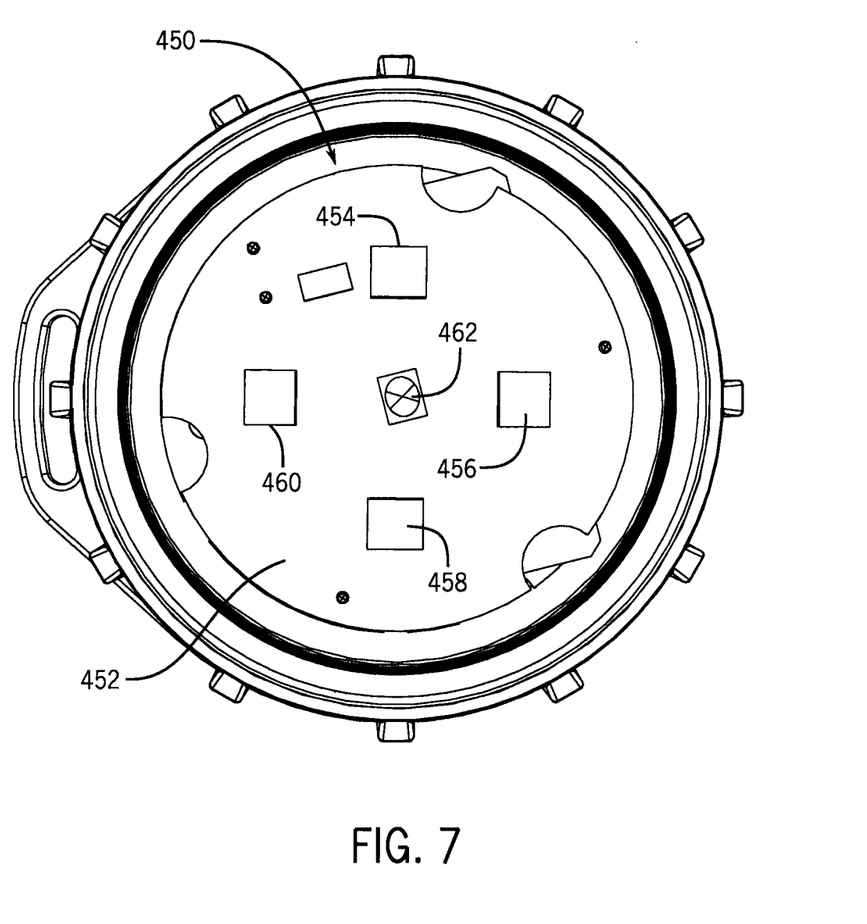
FIG. 7 is a top elevational view of the physical lighting circuit of a lighted cable termination assembly according to one embodiment of the invention.

FIG. 7 is a top elevational view of a physical lighting circuit 450 located in the lighted cable termination assembly 100. The physical lighting circuit 450 can contain a plurality of light emitting components mounted to a di-electric material in the form of a printed circuit board 452. The plurality of light emitting components can be provided as five light emitting diodes 454, 456, 458, 460 and 462, which are defined as a central light emitting diode 462 surrounded by four exterior light emitting diodes 454, 456, 458, 460. The plurality of light emitting diodes 454, 456, 458, 460 and 462 can be arranged in numerous, different orientations, depending on the specific application. For example, in one embodiment, the central light emitting diode 462 can be positioned in a substantially central orientation of the printed circuit board 452. The central light emitting diode 462 can be installed onto the printed circuit board 462 to project light substantially perpendicular to the surface of the printed circuit board 452. In one embodiment, the central light emitting diode 462 can have an illumination angle of about 30°. In an alternative embodiment, the central light emitting diode 462 can have an illumination angle of about 120°. Typical light emitting diodes useful as the central light emitting diode 462 can be of the model LR T64F-BBDB-1-1 or LT T64G-DAFA-29-Z available from OSRAM Opto Semiconductors, Inc.

Furthermore, the exterior light emitting diodes 454, 456, 458, 460 can be positioned on the printed circuit board 452 substantially equidistant from the central light emitting diode 462. The exterior light emitting diodes 454, 456, 458, 460 can additionally be positioned at 90° angles with respect to each other, forming a cross-shaped configuration. Additionally, the exterior light emitting diodes 454, 456, 458, 460 can be installed onto the printed circuit board 452 to project light substantially parallel to the surface of the printed circuit board 452. In one embodiment, the exterior light emitting diodes 454, 456, 458, 460 can have an illumination angle of about 120°. Typical light emitting diodes useful as the exterior light emitting diodes can be type LS A67F-U1AA-1-Z or LT A6SG-V1AB-36-Z available from OSRAM Opto Semiconductors, Inc.

Figure 8:
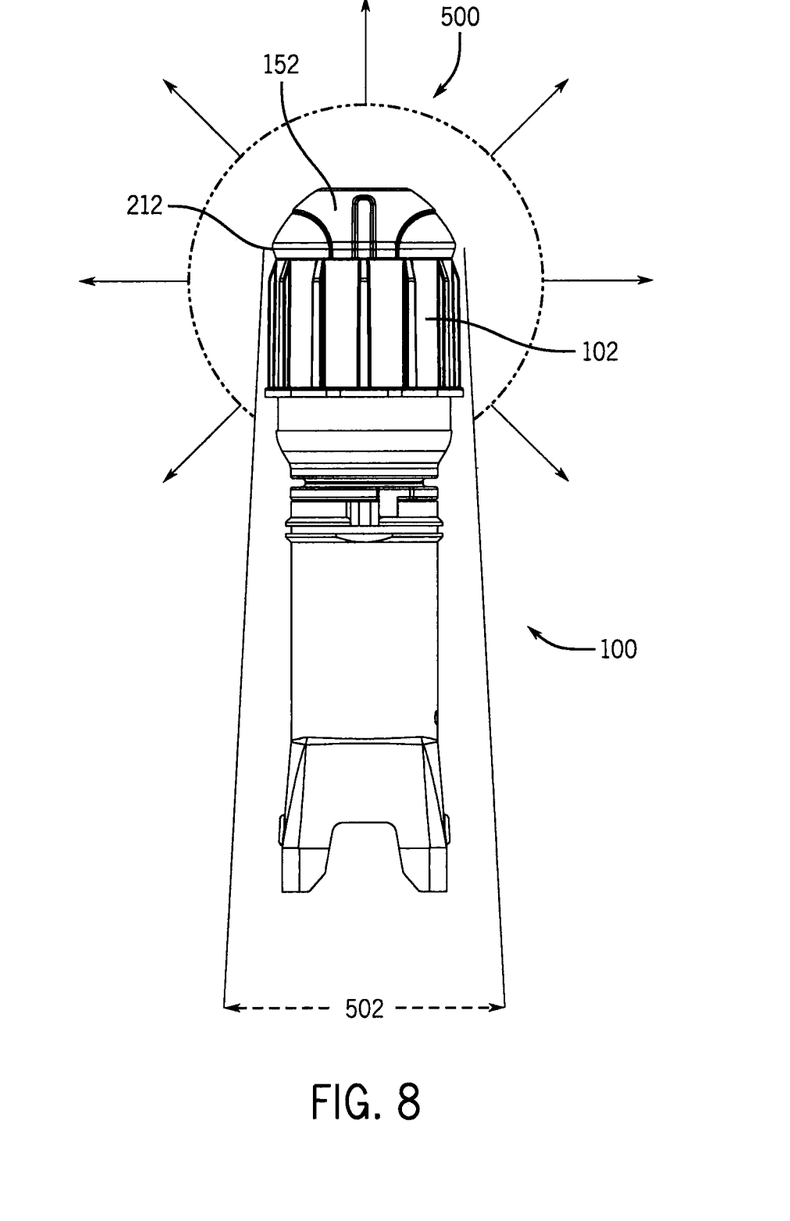
FIG. 8 is a side elevational view showing an illumination viewing angle of a lighted cable termination assembly according to one embodiment.

FIG. 8 presents a front isometric view of a representation of a typical illumination dispersion of the lighted cable termination assembly 100. The lighted end cap device 102 of the lighted cable termination assembly includes the lens 152 with the proud surface 212 to provide for a wide viewing angle 500. Additionally, the diffuser 300 can also increase the viewing angle by diffusing the light transmitted therefrom. The plurality of prismatic elements 304 contained within the diffuser can reflect and/or diffract the light from the lighting components 402 based on the angle of entry and the ratio of the refractive indices across the transition (e.g., air to polycarbonate). The light exiting the lighting component 402 and passing through the plurality of prismatic elements 304 can be diffracted, thereby creating a wider dispersal pattern than is possible via the lighting component 402 without prismatic elements 304. The dispersion of light from the lighted cable termination assembly 100 can vary depending on the refractive indices of the lens 152 material, the angle of light entry from the lighting components 402 and the shape of the plurality of prismatic elements 304. Additionally, the proud surface 212 of the lens 152 can allow for a viewing angle 500 only limited by the lighted cable termination assembly 100 or other obstruction creating an area of substantially small area of non-illumination 502.

Figure 9:
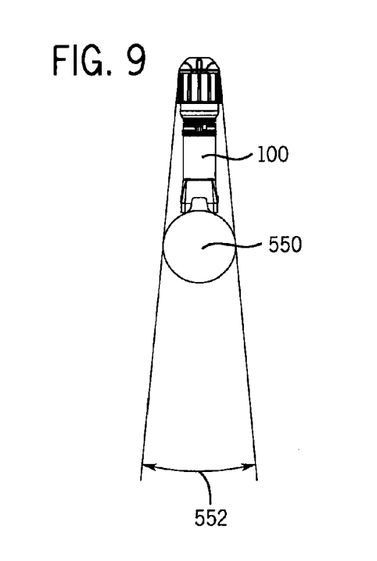
FIG. 9 is a side elevational view showing an obstructed viewing angle of a lighted cable termination assembly installed on a 4 inch (10 cm) pipe.
Figure 10:
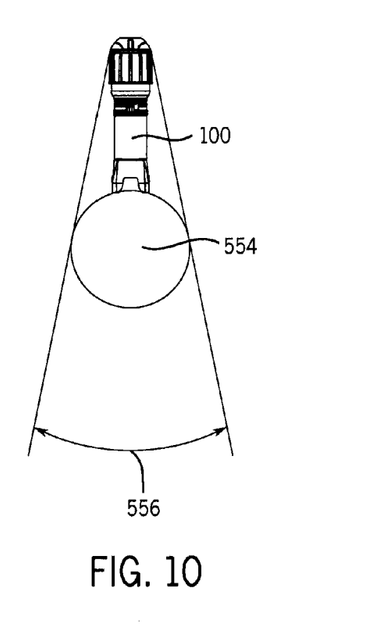
FIG. 10 is a side elevational view showing an obstructed viewing angle of a lighted cable termination assembly installed on a 6 inch (15.25 cm) pipe.
Figure 11:
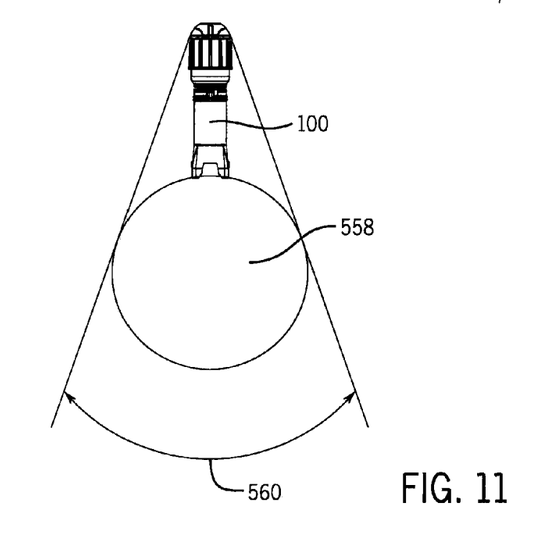
FIG. 11 is a side elevational view showing an obstructed viewing angle of a lighted cable termination assembly installed on a 10 inch (25.4 cm) pipe.

FIGS. 9-11 represent various obstructed viewing angles that are presented to a user assuming the lighted cable termination assembly 100 includes the plurality of light emitting diodes 454, 456, 458, 460, 462 in the configuration shown in FIG. 7 and assuming a user is standing directly under the lighted cable termination assembly 100. The obstructed viewing angle correlates to how much of the non-obstructed viewing angle may be obstructed by a pipe and/or components of the lighted cable termination assembly 100. The non-obstructed viewing angle is understood to be value of the angle in which illumination from the lighted cable termination assembly 100 can be seen. Thus, in a perfect example, where the illumination from the lighted cable termination assembly is not obstructed, the non-obstructed viewing angle would be 360° and the obstructed viewing angle would be 0°. In contrast to typical lighted cable termination assemblies, the obstructed viewing angles of the present disclosure are significantly smaller, representing less obstruction for the user. More particularly, the obstructed viewing angle on known lighted cable termination assemblies may be typically more than about 100° assuming installation on a 10 cm diameter pipe. In some known systems, the obstructed viewing angle is greater than about 105°, or about 110°.

FIG. 9 presents a side view of the lighted cable termination assembly 100 installed on a 4-inch (10 cm) diameter pipe 550. In one embodiment, an obstructed viewing angle 552 can be determined by the diameter of the 4-inch (10 cm) diameter pipe 550. In this instance, the obstructed viewing angle 552 is about 10.5° when the lighted cable termination assembly 100 extends upwardly from the 4-inch (10 cm) diameter pipe 550, where the 4-inch (10 cm) diameter pipe 550 is orientated substantially parallel to the ground level 114 (see FIG. 1). In some embodiments, the obstructed viewing angle 552 is less than about 40°, or about 30°, or about 20°, or about 15°. In a specific embodiment, the obstructed viewing angle 556 is less than about 11°.

FIG. 10 is a side view of the lighted cable termination assembly 100 installed on a 6-inch (15.25 cm) diameter pipe 554. In one embodiment, the obstructed viewing angle 556 can be determined by the diameter of the 6-inch (15.25 cm) pipe 554. In this instance, the obstructed viewing angle 556 is about 20.7° when the lighted cable termination assembly 100 extends upwardly from the 6-inch (15.25 cm) pipe 554, where the 6-inch (15.25 cm) diameter pipe 554 is orientated substantially parallel to the ground level 114 (see FIG. 1). In some embodiments, the obstructed viewing angle 556 is less than about 60°, or about 50°, or about 40°, or about 25°. In a specific embodiment, the obstructed viewing angle 556 is less than about 21°.

FIG. 11 is a side view of the lighted cable termination assembly 100 installed on a 10-inch (25.4 cm) diameter pipe 558. In one embodiment, the obstructed viewing angle 560 can be determined by the diameter of the 10-inch (25.4 cm) diameter pipe 558. In this instance, the obstructed viewing angle 560 is about 36.6° when the lighted cable termination assembly 100 extends upwardly from the 10 inch (25.4 cm) pipe 558, where the 10-inch (25.4 cm) diameter pipe 558 is orientated substantially parallel to the ground level 114 (see FIG. 1). In some embodiments, the obstructed viewing angle 560 is less than about 80°, or about 60°, or about 50°, or about 40°. In a specific embodiment, the obstructed viewing angle 556 is less than about 37°.

Figure 12:
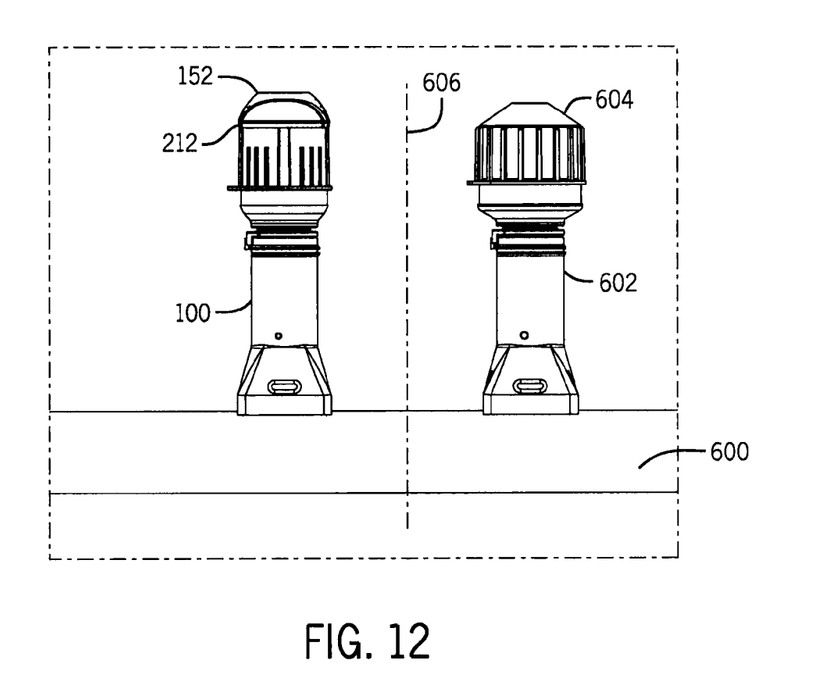
FIG. 12 is a side elevational view of an embodiment of a lighted cable termination assembly disposed adjacent a previously known lighted cable termination assembly installed on a 4-inch (25.4 cm) pipe.

FIG. 12 depicts the lighted cable termination assembly 100 having the lens 152 with the proud surface 212 coupled to a pipe 600. A previously known lighted cable termination assembly 602 is also coupled to the pipe 600. In the present example, the pipe 600 can have about a 10 cm diameter. The previously known lighted cable termination assembly 602 includes a lens 604 that does not have a proud surface, but rather tapers in a substantially continuous manner. The previously known lighted cable termination assembly 602 can be a typical embodiment of a lighted cable termination assembly known in the art, such as the RAYCHEM brand E-100-L-A lighted cable termination assembly provided by Pentair. Both the lighted cable termination assembly 100 and the previously known lighted cable termination assembly 602 are coupled to the pipe 600 opposite the ground level 114 and substantially parallel to a longitudinal axis 606. The longitudinal axis 606 can be perpendicular to the ground level 114 (see FIG. 1).

Figure 13:
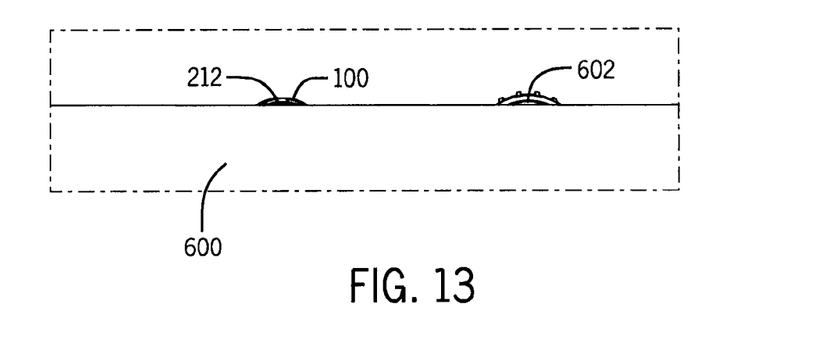
FIG. 13 is an isometric view of the lighted cable termination assembly and previously known lighted cable termination assembly of FIG. 12 viewed at about a 6° angle with respect to a longitudinal axis.

FIG. 13 shows an elevational view from beneath the pipe 600 at a 6° angle with respect to the longitudinal axis 606 of the pipe 600. When viewed at a 6° angle from the longitudinal axis 606 of the pipe 600, the proud surface 212 of the lens 152 of the lighted cable termination assembly 100 can be seen by a user 108 at ground level 114. In contrast, the lens 604 of the previously known lighted cable termination assembly 602 cannot be seen by a user 108 at ground level 114 when viewed from the substantially same position.

Figure 14:
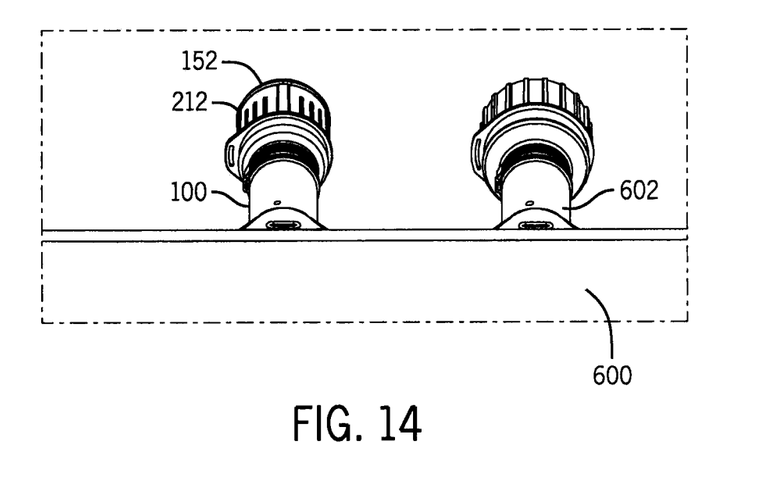
FIG. 14 is an isometric view of the lighted cable termination assembly and previously known lighted cable termination assembly of FIG. 12 viewed at about a 30° angle with respect to a longitudinal axis.

FIG. 14 presents an isometric view from beneath the pipe 600 at about a 30° angle with respect to the longitudinal axis 606 of the pipe 600. When viewed at a 30° angle from the longitudinal axis 606 of the pipe 600, the proud surface 212 of the lens 152 can be seen by a user 108 at ground level 114. In contrast, the lens 604 of the previously known lighted cable termination assembly 602 cannot be seen by a user 108 at ground level 114 when viewed at a 30° angle from the longitudinal axis of the pipe 600.

Figure 15:
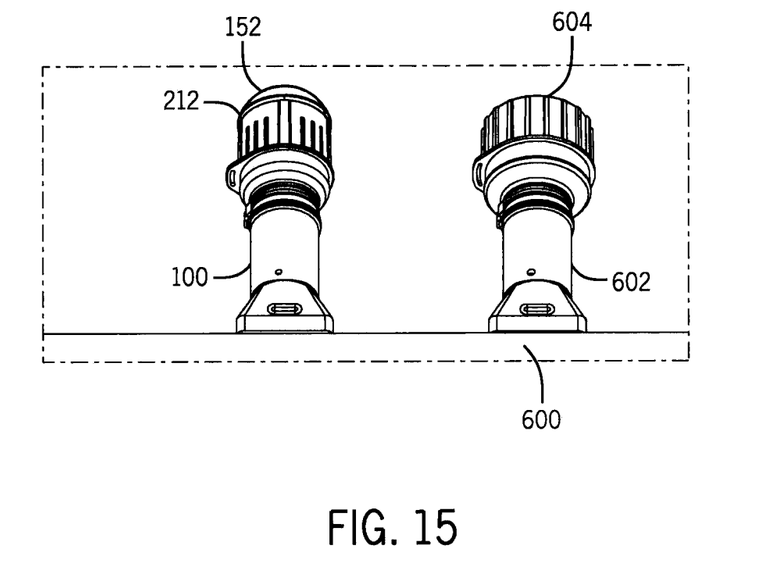
FIG. 15 is an isometric view of the lighted cable termination assembly and previously known lighted cable termination assembly of FIG. 12 viewed at about a 54° angle with respect to a longitudinal axis.

FIG. 15 presents an isometric view from beneath the pipe 600 at about a 54° angle with respect to the longitudinal axis 606 of the pipe 600. When viewed at a 54° angle from the longitudinal axis 606 of the pipe 600, both the lens 152 of the lighted cable termination assembly 100 and the lens 604 of the previously known lighted cable termination assembly 602 can be seen by a user 108 at ground level 114. However, as can be seen in FIG. 15, a substantially larger portion of the lens 152 of the lighted cable termination assembly 100 can be seen as compared to the lens 604 of the previously known lighted cable termination assembly 602. Thus, the above examples described in FIGS. 13-15 illustrate that the lens 152 of lighted cable termination assembly 100 provides for a greater viewing angle than the lens 604 of the previously known lighted cable termination assembly 602.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. A lens assembly for use in a lighted cable termination assembly, comprising:
   a lens including a curved sidewall and a pedestal, the pedestal including an end opening in a first end of the pedestal and the pedestal terminating, at a second end of the pedestal, at a lower end of the curved sidewall, the second end of the pedestal being substantially circular with a first diameter; and
   a plurality of light emitting diodes disposed within the lens,
   the curved sidewall including a proud surface disposed adjacent to the lower end of the curved sidewall, the proud surface extending radially outside of a perimeter of the pedestal to provide illumination from a plurality of viewing angles as viewed from below of the lens assembly,
   a lower edge of the lower end of the curved sidewall extending radially outside of the perimeter of the pedestal, the lower edge of the lower end of the curved sidewall being substantially circular with a second diameter larger than the first diameter.

2. The lens assembly of claim 1, wherein the curved sidewall of the lens slopes upwardly and inwardly from the proud surface until terminating at a substantially flat upper surface.

3. The lens assembly of claim 1, wherein the pedestal is substantially cylindrical and includes a threaded portion and one or more substantially rectangular openings arranged adjacent to the opening.

4. The lens assembly of claim 1, wherein the proud surface of the lens extends outwardly between about 5% to about 20% further than the lower edge of the lens.

5. The lens assembly of claim 1, wherein the lens emits green light when the lighted cable termination assembly is operating, properly and emits red light when the lighted cable termination assembly is not operating properly.

6. The lens assembly of claim 1, wherein five light emitting diodes are disposed in the lens and are in substantial alignment with a plane formed by the proud surface.

7. The lens assembly of claim 1, wherein the proud surface protrudes outwardly adjacent an upper edge of a stand.

8. A lens assembly for use in a lighted cable termination assembly, comprising:
   a lens including a curved sidewall and a pedestal,
      the pedestal including an end opening in a first end of the pedestal and the pedestal terminating, at a second end of the pedestal, at a lower end of the curved sidewall,
      the pedestal being substantially cylindrical and including a threaded portion and one or more substantially rectangular openings arranged adjacent to the opening; and
   a plurality of light emitting diodes disposed within the lens,
   the curved sidewall including a proud surface disposed adjacent to the lower end of the curved sidewall, the proud surface extending radially outside of a perimeter of the pedestal to provide illumination from a plurality of viewing angles as viewed from below of the lens assembly.

* * * * *